US011535537B2

(12) United States Patent
Bera et al.

(10) Patent No.: US 11,535,537 B2
(45) Date of Patent: Dec. 27, 2022

(54) PROCESS FOR REMOVAL OF SELENIUM FROM WATER BY DITHIONITE IONS

(71) Applicant: ECOLAB USA INC., St. Paul, MN (US)

(72) Inventors: Tarun Kumar Bera, Maharashtra (IN); Jitendra T. Shah, Naperville, IL (US); Vaideeswaran Sivaswamy, Pune (IN)

(73) Assignee: Ecolab USA Inc., St. Paul, MN (US)

( * ) Notice: Subject to any disclaimer, the term of this patent is extended or adjusted under 35 U.S.C. 154(b) by 325 days.

(21) Appl. No.: 15/541,619

(22) PCT Filed: Oct. 26, 2015

(86) PCT No.: PCT/US2015/057302
§ 371 (c)(1),
(2) Date: Jul. 5, 2017

(87) PCT Pub. No.: WO2016/111739
PCT Pub. Date: Jul. 14, 2016

(65) Prior Publication Data
US 2017/0349462 A1 Dec. 7, 2017

(30) Foreign Application Priority Data
Jan. 6, 2015 (GB) ..................... 1500089

(51) Int. Cl.
C02F 1/52 (2006.01)
C02F 1/70 (2006.01)
C01B 17/66 (2006.01)
C01B 19/02 (2006.01)
C02F 101/10 (2006.01)
C02F 103/18 (2006.01)
C02F 1/66 (2006.01)
C02F 101/20 (2006.01)
C02F 103/10 (2006.01)

(52) U.S. Cl.
CPC ............ C02F 1/5245 (2013.01); C01B 17/66 (2013.01); C01B 19/02 (2013.01); C02F 1/70 (2013.01); C02F 1/66 (2013.01); C02F 2101/106 (2013.01); C02F 2101/20 (2013.01); C02F 2103/10 (2013.01); C02F 2103/18 (2013.01)

(58) Field of Classification Search
CPC .................................................. C02F 1/5245
See application file for complete search history.

(56) References Cited

U.S. PATENT DOCUMENTS

| 5,389,262 A | 2/1995 | Guess |
| 6,183,644 B1 | 2/2001 | Adams et al. |
| 6,197,201 B1 | 3/2001 | Misra et al. |
| 6,228,270 B1 | 5/2001 | Houlach et al. |
| 8,282,835 B2 | 10/2012 | Schwarz et al. |
| 2005/0082233 A1 | 4/2005 | Ludwig et al. |
| 2007/0084769 A1* | 4/2007 | Moulton ............ C02F 1/74 210/150 |
| 2007/0241309 A1* | 10/2007 | Uradnisheck ......... B32B 27/32 252/188.28 |
| 2011/0174743 A1* | 7/2011 | Huang ............... B01J 20/0229 210/758 |
| 2012/0024798 A1 | 2/2012 | Pickett et al. |

FOREIGN PATENT DOCUMENTS

| CN | 104402070 A | 3/2015 |
| WO | WO 2013/117996 A1 | 8/2013 |

OTHER PUBLICATIONS

International Search Report for PCT/US2015/057302, dated Jan. 24, 2016 (4 pages).
Murphy, Andrew P., "Removal of Selenate from Water by Chemical Reduction." Industrial & Engineering Chemistry Research (1988), vol. 27, pp. 187-191.

* cited by examiner

Primary Examiner — Peter Keyworth
(74) Attorney, Agent, or Firm — Eric D. Babych; Barnes & Thornburg LLP

(57) ABSTRACT

A method for efficiently removal of oxidised selenium from liquid, such as FGD wastewater. The method involves adding a non-iron-based reducing agent (e.g. sodium dithionite) and preferably Fe(II) ions to the liquid at a pH of above 7.5 or 8 and precipitating elemental selenium from the liquid.

12 Claims, 4 Drawing Sheets

| Constituents | Unit | Untreated | Post Treatment FeSO$_4$ (360 ppm) |
| --- | --- | --- | --- |
| Ba | mg/L | 0.07 | 0.08 |
| B | mg/L | 220 | 210 |
| Ca (as CO$_3$) | mg/L | 1900 | 2400 |
| Fe | mg/L | <0.25 | <0.25 |
| Mg (as CO$_3$) | mg/L | 3600 | 3300 |
| K | mg/L | 27 | 28 |
| Se | mg/L | 0.98 | 0.79 |
| SiO$_2$ | mg/L | 30 | 6.1 |
| Na | mg/L | 240 | 250 |
| Cl | mg/L | 1490 | 1470 |
| SO$_4$ | mg/L | 3200 | 3200 |
| Alkalinity | mg/L | 180 | 440 |
| Conductivity | mS/cm | 8900 | 9200 |
| Hardness | mg/L | 5500 | 5700 |
| pH | | 7.8 | 8.6 |

FIG. 1

| Constituents | Unit | Untreated | Post Treatment FeSO$_4$ (720 ppm) |
|---|---|---|---|
| Ba | mg/L | 0.07 | 0.08 |
| B | mg/L | 220 | 210 |
| Ca (as CO$_3$) | mg/L | 1900 | 2500 |
| Fe | mg/L | <0.25 | <0.25 |
| Mg (as CO$_3$) | mg/L | 3600 | 3300 |
| K | mg/L | 27 | 28 |
| Se | mg/L | 0.98 | 0.68 |
| SiO$_2$ | mg/L | 30 | 4.6 |
| Na | mg/L | 240 | 240 |
| Cl | mg/L | 1490 | 1470 |
| SO$_4$ | mg/L | 3200 | 3300 |
| Alkalinity | mg/L | 180 | 430 |
| Conductivity | mS/cm | 8900 | 9100 |
| Hardness | mg/L | 5500 | 5800 |
| pH | | 7.8 | 8.6 |

FIG. 2

| Constituents | Unit | Untreated | Post Treatment 1 | Post Treatment 2 |
| --- | --- | --- | --- | --- |
| Ba | mg/L | 0.07 | 0.03 | 0.04 |
| B | mg/L | 220 | 260 | 250 |
| Ca (as $CO_3$) | mg/L | 1900 | 2500 | 2400 |
| Fe | mg/L | <0.25 | <0.15 | <0.10 |
| Mg (as $CO_3$) | mg/L | 3600 | 3500 | 3400 |
| K | mg/L | 27 | 40 | 37 |
| Se | mg/L | 0.98 | 0.23 | 0.26 |
| $SiO_2$ | mg/L | 30 | 2.6 | 3.2 |
| Na | mg/L | 240 | 490 | 480 |
| Cl | mg/L | 1490 | 1440 | 1410 |
| $SO_4$ | mg/L | 3200 | 3700 | 3700 |
| Alkalinity | mg/L | 180 | 360 | 350 |
| Conductivity | mS/cm | 8900 | 9800 | 9600 |
| Hardness | mg/L | 5500 | 6000 | 5800 |
| pH | | 7.8 | 8.5 | 8.4 |

FIG. 3

| Constituents | Unit | Untreated | Post Treatment Dithionite (800 ppm) |
|---|---|---|---|
| Ba | mg/L | 0.07 | 0.03 |
| B | mg/L | 220 | 250 |
| Ca (as $CO_3$) | mg/L | 1900 | 2600 |
| Fe | mg/L | <0.25 | <0.10 |
| Mg (as $CO_3$) | mg/L | 3600 | 3500 |
| K | mg/L | 27 | 38 |
| Se | mg/L | 0.98 | 0.59 |
| $SiO_2$ | mg/L | 30 | 9 |
| Na | mg/L | 240 | 470 |
| Cl | mg/L | 1490 | 1490 |
| $SO_4$ | mg/L | 3200 | 3500 |
| Alkalinity | mg/L | 180 | 630 |
| Conductivity | mS/cm | 8900 | 9700 |
| Hardness | mg/L | 5500 | 6100 |
| pH | | 7.8 | 8.9 |

FIG. 4

PROCESS FOR REMOVAL OF SELENIUM FROM WATER BY DITHIONITE IONS

CROSS-REFERENCE TO RELATED APPLICATION

This application claims priority to Great Britain Patent Application Serial No. 1500089.6 filed on Jan. 6, 2015, the disclosure of which is incorporated herein by reference in its entirety.

FIELD OF THE INVENTION

This invention relates generally to the treatment of liquid to remove selenium therefore and more particularly, although not exclusively, to the removal of selenium from water, such as industrial wastewater.

BACKGROUND TO THE INVENTION

Around the world stringent regulations are in place to limit the discharge of selenium into the water course. Many industries generate selenium-containing wastewaters, notably mining and energy generation, for example coal-fired power stations.

Industrial wastewaters from, for example, power plants, mining operations and refineries contain significant amounts of selenium that originates from coal and oil, for example the coal used for power generation and some types of crude oil used for refining. Regulations may vary from state to state and may have different discharge limits.

Overall, selenium exists in various species including elemental selenium, selenocyanate, selenite, and selenate. Of these, selenate is the most stable species and the major soluble species in natural waters. Oil refineries mostly contain reduced forms of selenium such as selenocyanate because the water exhibits a chemically reducing environment. The flue gas de-sulfurization (FGD) wastewater of coal fired power plants predominantly contains selenite and selenate due to its chemically oxidative environment (i.e. forced oxidation for gypsum production, $SO_x$ capture, etc.). All of these species are highly soluble except for elemental selenium.

There is a strong need for the removal of selenium from these wastewaters to meet current and future regulations.

BRIEF SUMMARY OF THE INVENTION

The invention is directed to the use of a non-iron based reducing agent to remove selenium from a liquid. In an embodiment the liquid is water. In another embodiment the liquid is waste water. In a further embodiment the liquid is waste water from an industrial process, for example a power plant, mining operation or refinery. In a further embodiment the liquid is wastewater from a power plant flue gas desulphurization (FGD) process.

The method preferably causes elemental selenium to precipitate from the liquid, to allow the selenium to be collected and, preferably, to render the liquid sufficiently selenium-free as to meet discharge standards.

In an embodiment the reducing agent is a dithionite ion, preferably an alkali metal dithionite, for example one or more of lithium, sodium, potassium, rubidium dithionite.

The inventors have found that dithionite ions act synergistically with Fe(II) ions to remove selenium, and specifically selenium (VI) and/or selenium (IV) species.

Thus an embodiment of the invention relates to a method of reducing selenium (for example Se(VI) ions) content in water by contacting the water with dithionite ions and a ferric salt, and preferably lime, at an alkalinic pH, heating with water for a period of time to allow or cause elemental selenium to precipitate from the water.

We prefer that water has a pH of from 8 to 10. The inventors believe that the reaction rate is fastest at a pH in the range of 8 to 10.

At least another embodiment of the invention is directed towards a composition for selenium removal, the composition comprising an alkali metal dithionite located or dissolved in an aqueous solution of a ferric (Fe(II)) salt. The alkali metal dithionite is preferably sodium dithionite, the ferric (Fe(II)) salt may be iron sulphate. Lime may be added to the composition. The pH of the composition may be above 7.5, say above 8 and in some embodiments from 8 to 10.

Thus, a first aspect of the invention provides a method of reducing the selenium content of wastewater, the method comprising contacting the wastewater with Fe(II) ions and a non-iron-based reducing agent (M), preferably a dithionite ion. In an embodiment the method is carried out at a pH in the range of from 7.5 to 10.5, for example at a pH in the range of 8 to 10. In an embodiment, the method may be carried out in the presence of lime, for example in the presence of sufficient lime to provide a pH in the range of from 7.5 to 10.5. In this specification a 'non-iron-based reducing agent' means either an iron-free reducing agent or a reducing agent which does not comprise iron as the reductant.

A further aspect of the invention provides a method removing selenium from water, the method comprising contacting the water with a non-iron based reducing agent (M) at a pH of greater than 7.5. In an embodiment the pH is greater than 8.

A yet further aspect of the invention provides composition for the reduction of selenium in FGD wastewater, the composition comprising Fe(II) ions and dithionite ions. In an embodiment the ratio of Fe(II) ions to dithionite ions may be in the range of 0.5 to 1.5.

In an embodiment, sufficient Fe(II) ions may be provided such that the ratio of iron to selenium (i.e. [Fe(II)]:[Se]) is in excess of 100.

In an embodiment sufficient Fe(II) ions may be used so that the initial ratio Fe(II) ions to selenium in the water (Fe(II):Se) is in excess of 100, preferably more than 110 and most preferably more than 120, 125, 130, 135, 140, 145, 150, 155, 160, 165.

In an embodiment the ratio of Fe(II) to non-iron-based reducing agent M (i.e [Fe(II):[M]) may be from 0.5 to 1.5, preferably 0.9 to 1.1.

The reducing agent (M), may be or comprise dithionite ions. The dithionite ions may be or be derived from an alkali metal dithionite. The alkali metal dithionite may be selected from lithium, sodium, potassium or rubidium dithionite, preferably sodium dithionite.

In an embodiment the pH may be controlled to be from 7.5 to 10.5. The pH may be controlled by the addition of lime.

An embodiment of the invention may comprise heating the water to be treated to a temperature of from 60 to 95° C., for example to a temperature of from 65 to 95° C.

The method may comprise contacting the water with calcium hydroxide. In an embodiment the ratio of calcium hydroxide to Fe(II) ions may be from 0.6 to 1.4.

BRIEF DESCRIPTION OF THE DRAWINGS

FIG. 1 contains a table showing the composition of water, untreated and treated with FeSO4 (360 ppm), analyzed by inductively coupled plasma (ICP) spectroscopy.

FIG. 2 contains a table showing the composition of water, untreated and treated with FeSO4 (720 ppm), analyzed by inductively coupled plasma (ICP) spectroscopy.

FIG. 3 contains a table showing the composition of water, untreated and treated with a combination of FeSO4 and a reducing agent (Na2S2O4), analyzed by inductively coupled plasma (ICP) spectroscopy.

FIG. 4 contains a table showing the composition of water, untreated and treated with a reducing agent (Na2S2O4), analyzed by inductively coupled plasma (ICP) spectroscopy.

DETAILED DESCRIPTION OF THE INVENTION

The removal of selenium (VI) by reduction-precipitation to elemental selenium (0) with ferrous hydroxide has been disclosed in the literature.

Selenocyanate, the major species present in oil refinery wastewaters at concentrations of 0.2-1 ppm, can easily be oxidized to selenite using oxidizing agent and pH control. An example of a process for the removal of selenocyanate ions is shown in US2012/0024798. Once most of the selenium is converted to selenite, it is then treated with ferric sulfate to bind the selenite and the resulting complex is subsequently precipitated with specialty Nalco metal removal product Nalmet 1689. This process is described in U.S. Pat. No. 8,282,835, which is owned by the current applicant. The disclosed process of treating refinery wastewater for selenium removal is currently practiced at a few refineries. It is believed that the major reason for success in this type of wastewater is the opportunity to carefully control the selenium speciation and the lower matrix interferences such as lower sulfate concentrations (<10 ppm) and hardness ($CaCO_3$=400 ppm). This method of removal typically reduces residual total selenium concentrations to 50 ppb. Unfortunately, we have found (both in the lab and in a field trial) that this process is not effective on power plant FGD wastewater.

Power plant wastewater generated from wet FGD scrubbers contains a significant amount of selenium (1 to 5 ppm) depending on the type of coal used for power generation. The selenium species present in the FGD wastewater are selenite (i.e. selenium (IV)) and selenate (i.e. selenium (VI)) at ratios that typically include selenate at more than 50%. Selenate is found to be the most stable, most soluble, and, consequently, the most difficult to remove. We believe, although we neither wish not intend to be bound by any theory, that one of the issues in the treatment of FGD wastewater is in relation to matrix interferences, which are significantly higher compared to oil refinery wastewater. For example, in FGD wastewater the concentration of sulfate ranges from 4000-8000 ppm (believed to be the major competing anion) and the hardness (i.e. $CaCO_3$ concentration) is measured around 5,300 ppm.

Selenium removal from FGD wastewater of coal fired power plants to meet the stringent environmental discharge norms (NPDES) is always very challenging. At present, the only option available is a biological method patented (e.g. U.S. Pat. No. 6,183,644) and commercialized by GE (sold under the trademark ABMet™). However this process is both capital intensive and requires significant operational management.

A chemical method for selenium removal has been reported in the literature (e.g. *Ind. Eng. Chem. Res* 1988 27(1) pp. 187-191).

The disclosed method for removal of selenium (VI) comprises reduction-precipitation to elemental selenium (0) with ferrous hydroxide, as shown in Reaction 1.

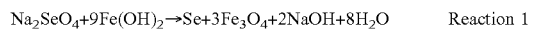

$$Na_2SeO_4 + 9Fe(OH)_2 \rightarrow Se + 3Fe_3O_4 + 2NaOH + 8H_2O \quad \text{Reaction 1}$$

The ferrous hydroxide, $Fe(OH)_2$ can be generated by reacting ferrous sulfate with lime. The inert reaction condition at 70° C. for 15 min at pH 9.0 was documented as the most favourable condition for selenium (VI) removal using ferrous hydroxide. It is believed that the precipitated selenium (Se) metal particles will be trapped within the $Fe_3O_4$ solid and a traditional solid-liquid separation method can be applied to furnish the selenium treated water.

However, our experiments have shown that this methodology achieves only limited success, for example in relation to selenium removal from power plant FGD wastewater.

Accordingly, it is an object of the invention to provide a chemical method of selenium removal which is more effective than prior art methods.

It is a further non-limiting object of the invention, to provide a chemical method of selenium removal which is cheap, robust and scalable.

The use of a non-iron-based reducing agent to remove selenium from a liquid, for example water, and compositions for use in removing selenium from a liquid is disclosed. In an embodiment, the water being treated is wastewater from an industrial process, such as a power plant, mining operation, or refinery. In a further embodiment, the water being treated is flue gas de-sulfurization (FGD) wastewater.

The method preferably causes elemental selenium to precipitate from the liquid, to allow the selenium to be collected and, preferably, to render the liquid sufficiently selenium-free as to meet discharge standards. In this regard, a non-iron based reducing agent has been found to remove selenium from wastewater. In an embodiment, the method comprises contacting water with a non-iron based reducing agent to remove selenium from the wastewater.

In another embodiment, the method comprises contacting water with a non-iron based reducing agent and iron to remove selenium from the wastewater. As shown in the examples, it has been discovered that the non-iron based reducing agent has a synergistic effect when used in combination with Fe (II) species. Without wishing to be bound by a particular theory, it is believed that the observed synergistic effect between iron and the non-iron based reducing agent occurs via, or because of, the formation of a sulphur dioxide radical. In an embodiment, the ratio of iron, such as Fe(II) species, and the non-iron reducing agent is from 0.5 to 1.5. In another embodiment, the ratio of iron, such as Fe(II) species, and the non-iron reducing agent is from 0.9 to 1.1.

In embodiments, an iron species, such as Fe(II), is added to the water being treated such that the ratio of Fe(II) ions to selenium in the water being treated is in excess of 100. In an embodiment, the ratio of Fe(II) ions to selenium in the water being treated is more than 110. In another embodiment, the ratio of Fe(II) ions to selenium in the water being treated is more than 120. In yet another embodiment, the ratio of Fe(II) ions to selenium in the water being treated is more than 125, more than 130, more than 135, more than 140, more than 145, more than 150, more than 155, more than 160, or more than 165.

In an embodiment, the reducing agent is a dithionite ion or salt thereof. It has been found that dithionite ions or salts thereof act synergistically with Fe(II) ions to remove selenium, and specifically selenium (VI) and/or selenium (IV) species. In an embodiment, the dithionite is an alkali metal dithionite. Examples of alkali metal dithionites include, but are not limited to, lithium, sodium, potassium, and rubidium dithionite.

In an embodiment of reducing selenium (for example Se(VI) ions) in water, the method comprises contacting the water with dithionite ions or a salt thereof and optionally a ferric salt at an alkalinic pH and heating the water for a period of time to allow or cause elemental selenium to precipitate from the water. In an embodiment, the water being treated according to the method is heated to a temperature of at least 60° C. In another embodiment, the water being treated according to the method is heated to a temperature from 60 to 95° C. In yet another embodiment, the water being treated according to the method is heated to a temperature from 65 to 95° C.

In an embodiment, the water being treated according to the method has a pH of about 8 or greater. In another embodiment, the water being treated according to the method has a pH from 7.5 to 10.5. In yet another embodiment, the water being treated according to the method has a pH from 8 to 10. It is believed that the reaction rate is fastest at a pH of 8 to 10.

In further embodiments, a pH regulator can be added to the water to regulate the alkalinity of the water. Examples of a pH regulator include but are not limited to calcium hydroxide, calcium oxide, calcium carbonate, lime, and combinations thereof. In an embodiment, the water being treated is contacted with calcium hydroxide in the presence or absence of Fe(II) ions). In a further embodiment, the water being treated is contacted with calcium hydroxide at a ratio of 0.6 to 1.4 calcium hydroxide to Fe(II) ions.

Another aspect of the invention is a composition for selenium removal. The composition generally comprises a non-iron reducing agent, such as a dithionite or salt thereof, and optionally iron, such as a ferric salt. The dithionite can be an alkali metal dithionite. Examples of alkali metal dithionite include but are not limited to, lithium, sodium, potassium, and rubidium dithionite. Examples of the ferric (Fe(II)) salt include iron sulphate. In an embodiment, the composition comprises an alkali metal dithionite located or dissolved in an aqueous solution of a ferric (Fe(II)) salt. In a preferred embodiment, the alkali metal dithionite is sodium dithionite. In an embodiment, the ratio of iron, such as Fe(II) species, and the non-iron reducing agent, such as dithionate, is from 0.5 to 1.5. In another embodiment, the ratio of iron, such as Fe(II) species, and the non-iron reducing agent, such as dithionite, is from 0.9 to 1.1.

In embodiments, the composition contains an amount of iron, such as Fe(II), that the ratio of Fe(II) ions to selenium in the water being treated is in excess of 100. In an embodiment, the composition contains an amount of iron, such as Fe(II), such that the ratio of Fe(II) ions to selenium in the water being treated is more than 110. In another embodiment, the composition contains an amount of iron, such as Fe(II), such that the ratio of Fe(II) ions to selenium in the water being treated is more than 120. In yet another embodiment, the composition contains an amount of iron, such as Fe(II), such that the ratio of Fe(II) ions to selenium in the water being treated is more than 125, more than 130, more than 135, more than 140, more than 145, more than 150, more than 155, more than 160, or more than 165.

The composition can optionally include a pH regulator to regulate the pH of the composition and/or to regulate the alkalinity of the water being treated. Examples of a pH regulator include but are not limited to calcium hydroxide, calcium oxide, calcium carbonate, lime, and combinations thereof. The composition generally comprises an alkalinic pH. In an embodiment, the composition comprises a pH of about 8 or greater. In another embodiment, the composition comprises a pH from 7.5 to 10.5. In yet another embodiment, the composition comprises a pH from 8 to 10.

The pH regulator can be added to the composition to regulate the alkalinity of the water being treated. Examples of a pH regulator include but are not limited to calcium hydroxide, calcium oxide, calcium carbonate, lime, and combinations thereof. In an embodiment, the water being treated is contacted with calcium hydroxide in the presence or absence of an iron species, such as Fe(II) ions. In an embodiment, the composition comprises a ratio of 0.6 to 1.4 of pH regulator to Fe(II) ions. In a further embodiment, the composition comprises a ratio of 0.6 to 1.4 calcium hydroxide to Fe(II) ions.

EXAMPLES

The following examples are illustrative and are provided to assist in a further understanding of the invention. Other embodiments are within the scope of the present invention. The particular materials and conditions employed are intended to be further illustrative of the invention.

In order to test the efficacy of the prior art method we conducted the following experiments, as follows:

Comparative Example 1—Prior Art

A power plant FGD wastewater (having a total selenium concentration of 0.98 ppm and a Se(VI):Se(IV) ratio of greater than 1) was placed in a round bottom flask equipped with a stirrer bar and placed on a heater. The wastewater was heated to 70-80° C. whilst purging with nitrogen. Purging continued for 30 to 60 minutes and then 1.5 ml of 10% lime slurry (equivalent to 600 ppm) was added to the reaction mixture. An aliquot of ferrous sulfate hexahydrate was added to the reaction mixture and the temperature maintained at 70-90° C. for 30 to 60 minutes and then allowed to cool to room temperature in an open atmosphere. The supernatant was filtered through a 0.45 micron syringe filer and the composition of the water was analysed by inductively coupled plasma (ICP) spectroscopy.

As can be seen in the table of FIG. 1, contacting the FGD wastewater with a solution to provide a Fe(II)/Se ration of 73 led to a 20% reduction in the selenium.

Comparative Example 2—Prior Art

A power plant FGD wastewater (having a total selenium concentration of 0.98 ppm) was placed in a round bottom flask equipped with a stirrer bar and placed on a heater. The wastewater was heated to 70-80° C. whilst purging with nitrogen. Purging continued for 30 to 60 minutes and then 1.5 ml of 10% lime slurry (equivalent to 600 ppm) was added to the reaction mixture. An aliquot of ferrous sulfate hexahydrate (200 mg) was added to the reaction mixture and the temperature maintained at 70-90° C. for 30 to 60 minutes and then allowed to cool to room temperature in an open atmosphere. The supernatant was filtered through a 0.45 micron syringe filer and the composition of the water was analysed by inductively coupled plasma (ICP) spectroscopy.

As can be seen in the table of FIG. 2, contacting the FGD wastewater with a solution to provide a Fe(II)/Se ratio of 147 led to a 30% reduction in the selenium.

Comparing Comparative Examples 1 and 2, it can be seen that doubling the amount of iron only leads to a modest (10%) increase in the amount of selenium removal.

In order to improve selenium removal, we conducted experiments in accordance with the invention where Fe(II) is used in combination with a reducing agent.

Example 3

A power plant FGD wastewater (having a total selenium concentration of 0.98 ppm) was placed in a round bottom flask equipped with a stirrer bar and placed on a heater. The wastewater was heated to 70-80° C. whilst purging with nitrogen. Purging continued for 30 to 60 minutes and then 1.5 ml of 10% lime slurry (equivalent to 600 ppm) was added to the reaction mixture. An aliquot of ferrous sulfate hexahydrate (200 mg) and solid sodium dithionite (200 mg) was added to the reaction mixture and the temperature maintained at 70-90° C. for 30 to 60 minutes and then allowed to cool to room temperature in an open atmosphere. A brownish to green solid settled out of the reaction mixture. The supernatant was filtered through a 0.45 micron syringe filer and the composition of the water was analysed by inductively coupled plasma (ICP) spectroscopy.

In the above experiments the ratio of Fe(II):Se is 163.

As can be seen in the table of FIG. 3, the reduction in the amount of selenium is markedly better when using iron and the reducing agent in combination that when using iron in isolation.

In order to check the efficacy of the system, a further experiment in accordance with the invention was conducted using the reducing agent in isolation.

Example 4

A power plant FGD wastewater (having a total selenium concentration of 0.98 ppm) was placed in a round bottom flask equipped with a stirrer bar and placed on a heater. The wastewater was heated to 70-80° C. whilst purging with nitrogen. Purging continued for 30 to 60 minutes and then 1.5 ml of 10% lime slurry (equivalent to 600 ppm) was added to the reaction mixture. An aliquot of solid sodium dithionite (200 mg) was added to the reaction mixture and the temperature maintained at 70-90° C. for 30 to 60 minutes and then allowed to cool to room temperature in an open atmosphere. The supernatant was filtered through a 0.45 micron syringe filer and the composition of the water was analysed by inductively coupled plasma (ICP) spectroscopy.

As can be seen in the table of FIG. 4, the dithionite reaction was slightly better than the reaction of iron in isolation.

We believe the dithionite ($S_2O_4^{2-}$) reaction proceeds as:

$$Na_2SeO_4 + X_2S_2O_4 \rightarrow Se + Na_2SO_4 \quad \text{Reaction 2}$$

(Where X is an alkali metal, for example Li, Na, K, Rb)

Whilst the dithionite reaction appears to be more able than iron to reduce the concentration of selenium, what is absolutely stark is the synergistic effect of the addition of iron and the reducing agent (e.g. Example 3). The results of Example 3 are markedly better than what one would expect from the addition of the reagents in isolation (e.g. from a comparison of Comparative Example 2 and Example 4).

Clearly, not only is the reducing agent able to remove selenium when used in isolation but has a demonstrated synergistic effect when used in combination with Fe(II) species.

Whilst we do not intend nor wish to be bound by any particular theory, we postulate that the synergistic effect between iron and dithionate ions may occur via, or because of, the formation of a sulphur dioxide radical. Therefore, we believe that any dithionite salt will be capable of reacting synergistically with Fe(II) ions to remove selenium from waste water.

The invention claimed is:

1. A method of reducing the selenium content of wastewater, the method comprising contacting the wastewater with Fe(II) ions, and a dithionite ion (M), at a pH of from 7.5 to 10.5 and in the presence of lime; and
heating the wastewater to a temperature of from 60 to 95° C.,
wherein the wastewater comprises selenite and selenate,
wherein the wastewater further comprises from 4000 to 8000 ppm of sulfate,
wherein the wastewater is purged with nitrogen.

2. The method according to claim 1, wherein sufficient Fe(II) ions are used so that the initial ratio Fe(II) ions to selenium in the water (Fe(II):Se) is in excess of 100.

3. The method according to claim 1, wherein the ratio of Fe(II):M is from 0.5 to 1.5.

4. The method according to claim 1, comprising heating the water to a temperature of from 70 to 95° C.

5. The method according to claim 1, comprising contacting the water with a pH modifier, wherein the pH modifier comprises calcium hydroxide.

6. The method according to claim 5, wherein the ratio of pH modifier to Fe(II) ions is from 0.6 to 1.4.

7. The method according to claim 1, comprising contacting the wastewater with a lime slurry.

8. The method according to claim 1, wherein the wastewater is flue gas desulfurization (FGD) wastewater.

9. The method according to claim 1, wherein the dithionite ion is added to the wastewater as a salt in an amount of 800 ppm.

10. The method according to claim 9, wherein the lime is added in an amount of 600 ppm, and the Fe(II) ions are added to the wastewater as a salt in an amount of 720 ppm.

11. A method of removing selenium from water, the method comprising contacting the water with a dithionite ion at a pH of 7.5 to 10.5; and heating the water to a temperature of from 70 to 95° C., wherein the wastewater comprises selenite and selenate, and from 4000 to 8000 ppm of sulfate, wherein the wastewater is purged with nitrogen.

12. The method according to claim 11, comprising contacting the water with Fe(II) ions.

* * * * *